United States Patent [19]

Claytor

[11] 4,289,019
[45] Sep. 15, 1981

[54] METHOD AND MEANS OF PASSIVE DETECTION OF LEAKS IN BURIED PIPES

[75] Inventor: Thomas N. Claytor, Woodridge, Ill.

[73] Assignee: The United States of America as represented by the United States Department of Energy, Washington, D.C.

[21] Appl. No.: 89,346

[22] Filed: Oct. 30, 1979

[51] Int. Cl.³ .............................................. G01M 3/24
[52] U.S. Cl. ................................................ 73/40.5 A
[58] Field of Search ........................ 73/40.5 A, 40.5 R

[56] References Cited

U.S. PATENT DOCUMENTS

| | | | |
|---|---|---|---|
| 3,264,864 | 8/1966 | Reid et al. | 73/40.5 A X |
| 3,851,521 | 12/1974 | Ottenstein | 73/40.5 R |
| 3,903,729 | 9/1975 | Covington | 73/40.5 R |

OTHER PUBLICATIONS

Exploratory Development of a Leak Location and Detection System for Underground Power Transmission Line Pipes, Argonne National Laboratory, Published Sep. 1978.

*Primary Examiner*—Gerald Goldberg
*Assistant Examiner*—Joseph W. Roskos
*Attorney, Agent, or Firm*—Donald P. Reynolds; Frank H. Jackson; Richard G. Besha

[57] ABSTRACT

A method and means for passive detection of a leak in a buried pipe containing fluid under pressure includes a plurality of acoustic detectors that are placed in contact with the pipe. Noise produced by the leak is detected by the detectors, and the detected signals are correlated to locate the leak. In one embodiment of the invention two detectors are placed at different locations to locate a leak between them. In an alternate embodiment two detectors of different waves are placed at substantially the same location to determine the distance of the leak from the location.

9 Claims, 6 Drawing Figures

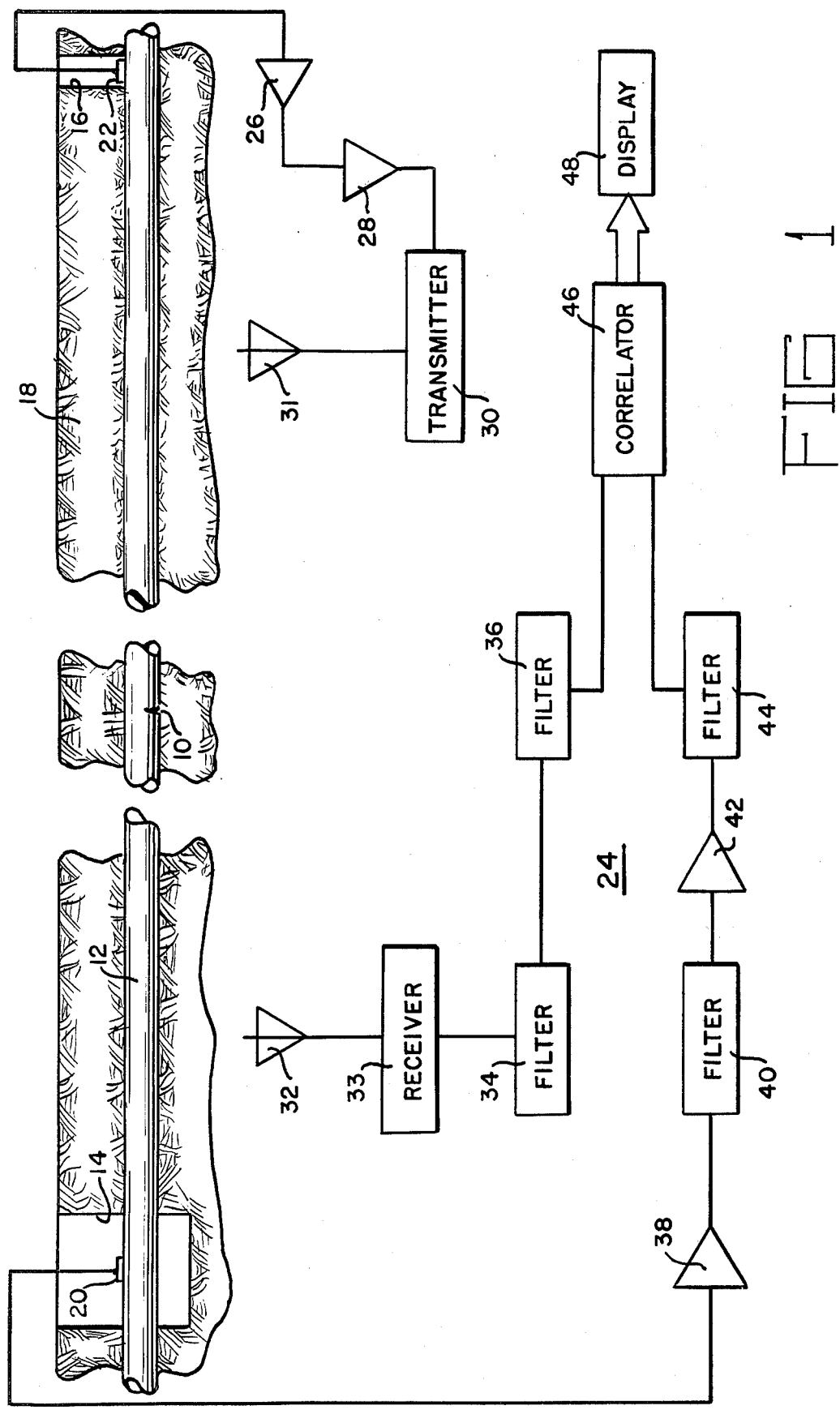

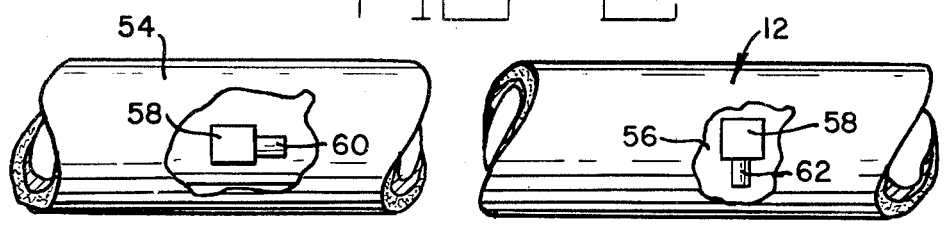
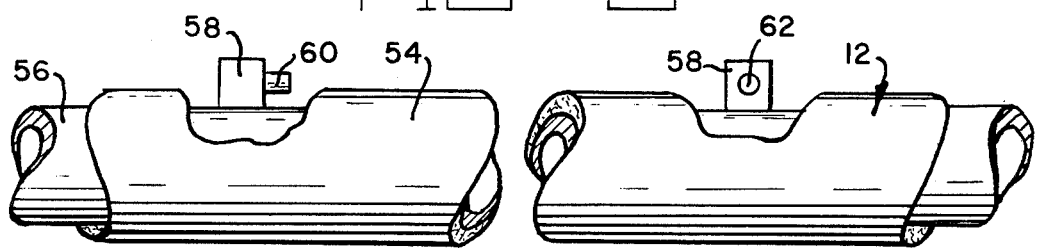
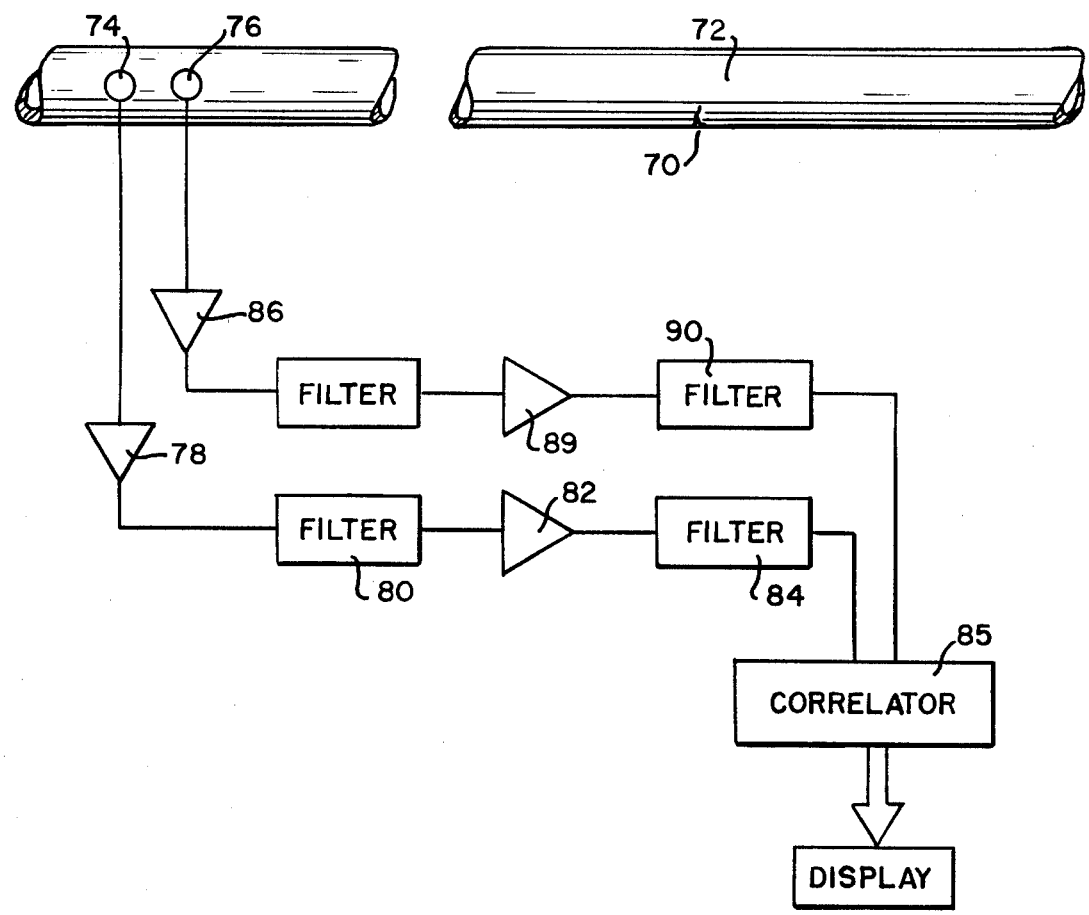

4,289,019

METHOD AND MEANS OF PASSIVE DETECTION OF LEAKS IN BURIED PIPES

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to the detection of leaks in pipes. In particular, this invention is a method and means of detecting the location of a leak in a buried pipe containing a fluid by analysis of the acoustical signals produced in the pipe or the fluid by the leak.

When fluids under pressure are contained or carried in buried pipes, a small local failure of the pipe causes two problems. One problem is to detect the fact that there is a leak; the other is to locate the leak to fix it. As a general rule, it may be stated that the smaller the leak, the more difficult it is to detect the presence of the leak and the more difficult it is to locate such a leak even if its presence is known. In some systems of water pipes a principal method of leak detection involves noticing the collapse of ground over a buried water pipe as a result of subsurface erosion from a leak. Such a method of detection is obviously undesirable in the case of expensive fluids that are carried in the pipes or of fluids that are corrosive or flammable. For many years natural gas has been doped with chemicals having strong odors to assist in the location of leaks. Such a method of leak detection, however, is of most use in the absence of pavement over the pipe. Pipe that is buried under concrete or other paving and that carries a corrosive or flammable substance presents a challenge that is not met by any of the detection systems just described.

Various types of active acoustic systems serve to detect leaks by exciting acoustic waves in the pipe or in the fluid conveyed in the pipe. Acoustic detectors are placed to detect signals produced by the discontinuities at the leak, either by responding to reflections generated by the discontinuity or by detecting differences produced in transmitted signals by the discontinuity in the pipe. Such systems, however, generally require substantial breaks in the pipes to generate signals that are large enough to be detected in the presence of the exciting signals.

It is an object of the present invention to provide a better method and means of detecting leaks in buried pipes.

It is a further object of the present invention to provide a method and means of locating leaks in buried pipes.

It is a further object of the present invention to provide a method and means of detecting leaks in pipes carrying fluids under pressure.

Other objects will become apparent in the course of a detailed description of the invention.

SUMMARY OF THE INVENTION

Leaks in buried pipes carrying or containing fluids are detected by a passive system that responds to acoustic signals generated by the leak. In one embodiment of the invention a detector of longitudinal or torsional acoustic signals is placed at a first location and a second detector of longitudinal or torsional acoustic signals is placed at a location on the other side of the leak. A radio broadcasting system is used to couple the signals detected by the two detectors to a single location for application to an apparatus for measuring the correlation between the two signals. The cross-correlogram of the two signals provides a measure of the distance of the leak from each of the two measuring points and hence of the location of the leak. In a second embodiment a detector of longitudinal acoustic signals and a detector of transverse acoustic signals are placed at the same location. A combination of the cross-correlogram of the two signals with the known differences in the velocity of propagation of longitudinal and transverse signals provides a measure of the distance of the leak from the measuring point. Signals may propagate either in the fluid or in the pipe.

BRIEF DESCRIPTION OF THE DRAWINGS

FIG. 1 is a block diagram of an apparatus for the practice of the invention on a buried pipe having a leak.

FIG. 2 is a top view of a coated pipe showing the placement of detectors for the practice of the present invention.

FIG. 3 is a side view of the pipe of FIG. 2 showing placement of the detectors.

FIG. 4 is a block diagram showing the placement of detectors at a single location for the practice of an alternate embodiment of the invention.

DETAILED DESCRIPTION OF THE INVENTION

Figure 5:
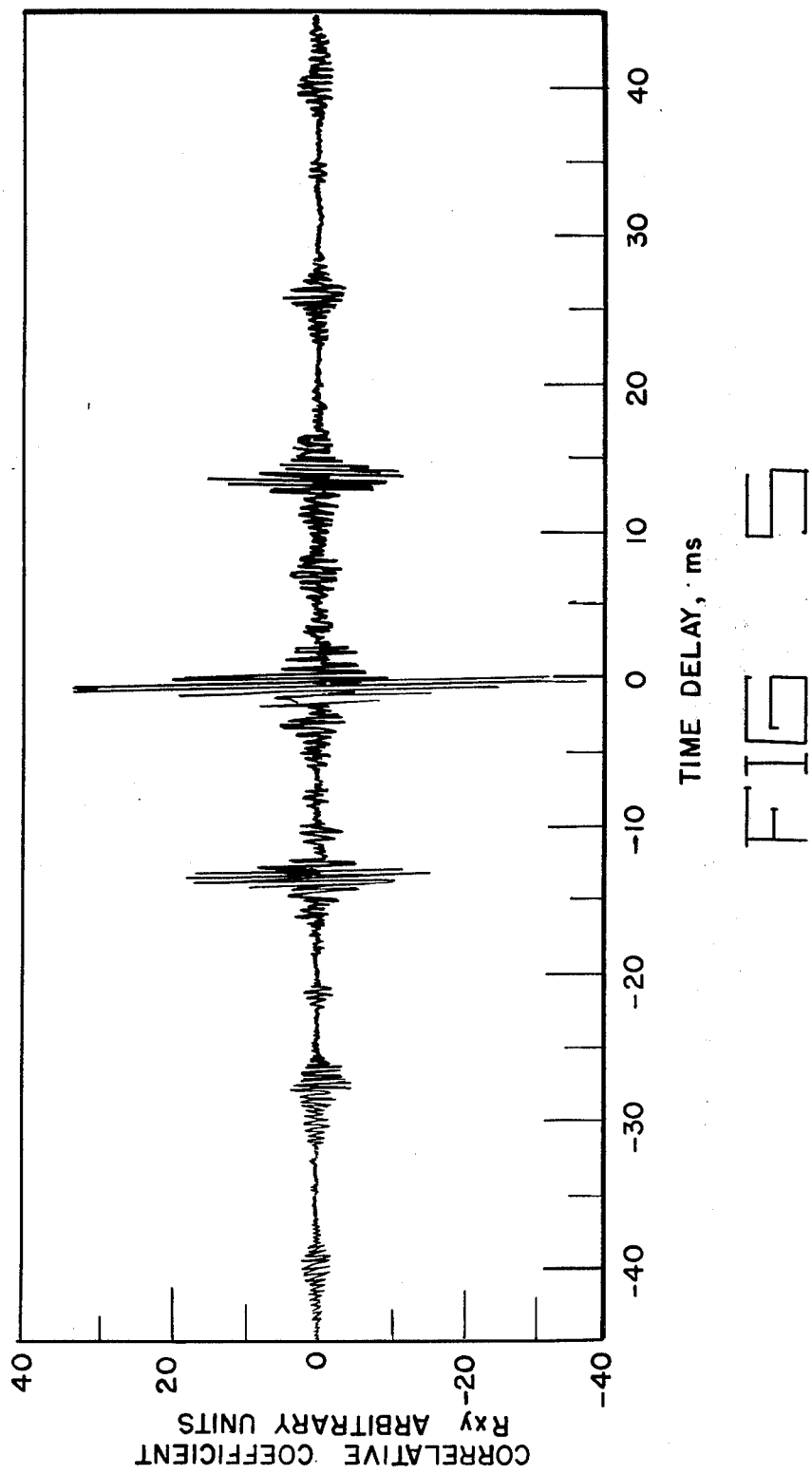
FIG. 5 is a plot of an observed correlation coefficient as a function of time delay.

FIG. 1 is a block diagram of an apparatus for the practice of the present invention. In FIG. 1 a leak 10 in a buried pipe 12 is located at a distance from a manhole 14 and a borehole 16 that has been sunk from the surface 18 to the pipe 12 to provide a measuring point. The manhole 14 and borehole 16 have been shown for illustration. It is evident that what is important is access to the pipe 12. If manholes were located conveniently then two manholes could be used or in the absence of conveniently located manholes it might be necessary to use two boreholes.

A transducer 20 is connected and coupled acoustically to pipe 12 in manhole 14 and another transducer 22 is connected to pipe 12 and coupled acoustically to it in borehole 16. The transducers 20 and 22 may be coupled to torsional waves or to longitudinal waves in the pipe 12. While the preferred mode of operation is to couple both transducers 20 and 22 to the same form of wave, it is also possible to couple one of the transducers 20 and 22 to a longitudinal wave and the other to a torsional wave. The form of the coupling is a matter of choice for the operator and will normally be made so as to detect the strongest signal.

The invention works because leaks generate noise in the pipe, the fluid or both. The term "noise" is here taken to refer to a signal that is substantially random in time although not necessarily completely random. Such a signal is describable by its spectrum. Two detected signals that are generated by the same leak will exhibit a cross-correlogram that can be interpreted to locate the leak. The cross-correlation is determined by the circuit of FIG. 1 in which the measuring equipment 24 is located near manhole 14. An acoustical signal that is detected by transducer 22 is there converted to an electrical signal that is amplified in preamplifier 26 and is amplified again as desired in a variable post-amplifier 28. The amplified signal from post-amplifier 28 is coupled to a radio transmitter 30 that must be capable of broadcasting a signal with a bandwidth of 7 kHz through a transmitting antenna 31 to a receiving antenna 32, thence to a receiver 33. The signal received by receiver 33 is applied to a bandpass filter 34 that passes frequencies in the range of 3 to 4 kHz. The output of bandpass filter 34 is connected to highpass filter 36 which passes frequencies above 150 Hz. At the same time transducer 20 receives a signal in manhole 14 and generates an electrical signal that is coupled to preamplifier 38. The output of preamplifier 38 is connected to bandpass filter 40 which passes frequencies in the range of 3 to 4 kHz. The output of bandpass filter is amplified as necessary in variable post-amplifier 42, and the amplified signal from post-amplifier 42 is applied to highpass filter 44 which passes frequencies above 150 Hz. The output signals from highpass filters 36 and 44 are applied to cross-correlator 46 to generate a cross-correlogram that is made visible on display device 48. The cross-correlogram of two signals is defined as a plot of the cross-correlation coefficient of the two signals as a function of the time delay between the signals. Knowledge of the distance between manhole 14 and borehole 16 and of the velocity of propagation of the wave detected by each of the transducers 20 and 22 provides information sufficient to interpret the correlogram displayed on display device 48 to locate the leak 10.

FIGS. 2 and 3 are views of a coated pipe showing the placement of detectors for the practice of the present invention. FIG. 2 is a top view and FIG. 3 is a side view of the same pipe. In FIGS. 2 and 3, pipe 12 is a carrier of a liquid such as fuel oil or a gas such as natural gas, or it may be an electrical conduit that includes a power line and an insulating fluid under pressure. When such a pipe 12 is buried underground, it is desirable to protect the outer surface by some means such as tar coating 54. When it is desired to detect or locate leaks in pipe 12, it is necessary to gain access to pipe 12 to remove tar to expose the surface 56 which is typically of steel. A coupling block 58 is placed against surface 56 in acoustical contact with surface 56 and an accelerometer is connected to coupling block 58 to convert acoustical signals into electrical signals. In FIGS. 2 and 3, accelerometer 60 is connected to coupling block 58 in such a way as to detect longitudinal acoustical waves in pipe 12 and accelerometer 62 is connected to respond to torsional acoustic waves in pipe 12. Reasons for the selection of longitudinal or torsional waves will become apparent in the description of the invention. It should be noted that the accelerometers 60 and 62 of FIGS. 2 and 3 could both be placed to respond either to longitudinal or torsional waves and that when they are placed on opposite sides of a suspected leak as shown in FIG. 1 it would normally be simpler to orient each of the accelerometers 60 and 62 of FIGS. 2 and 3 to respond to the same type of acoustical signal. This simplifies calculations in that the velocities of longitudinal and torsional signals are typically different, thus requiring an additional step of data processing if the arrangement of FIGS. 2 and 3 is used to make an actual measurement.

FIG. 4 is a block diagram of an alternate embodiment of the invention. In FIG. 4 a leak 70 produces noise in the fluid in a pipe 72. A longitudinal-wave tranducer 74 and a torsional-wave tranducer 76 are located together on the pipe 72 with access through a single manhole or borehole. The signal from longitudinal-wave transducer 74 is amplified in preamplifier 78, filtered in bandpass filter 80 and fed to variable post-amplifier 82. The amplified signal from post-amplifier 82 is applied through highpass filter 84 to correlator 85. The output of torsional-wave tranducer 76 is amplified in preamplifier 86 and applied to bandpass filter 88. The output of bandpass filter 88 is connected through variable post-amplifier 89 to highpass filter 90, thence to correlator 85. Statistical correlation between the two signals is made visible on display device 92 in which a knowledge of the differences in the velocity of propagation of longitudinal waves and torsional waves in the fluid provides a measure of the distance of the leak from the measuring point.

Figure 6:
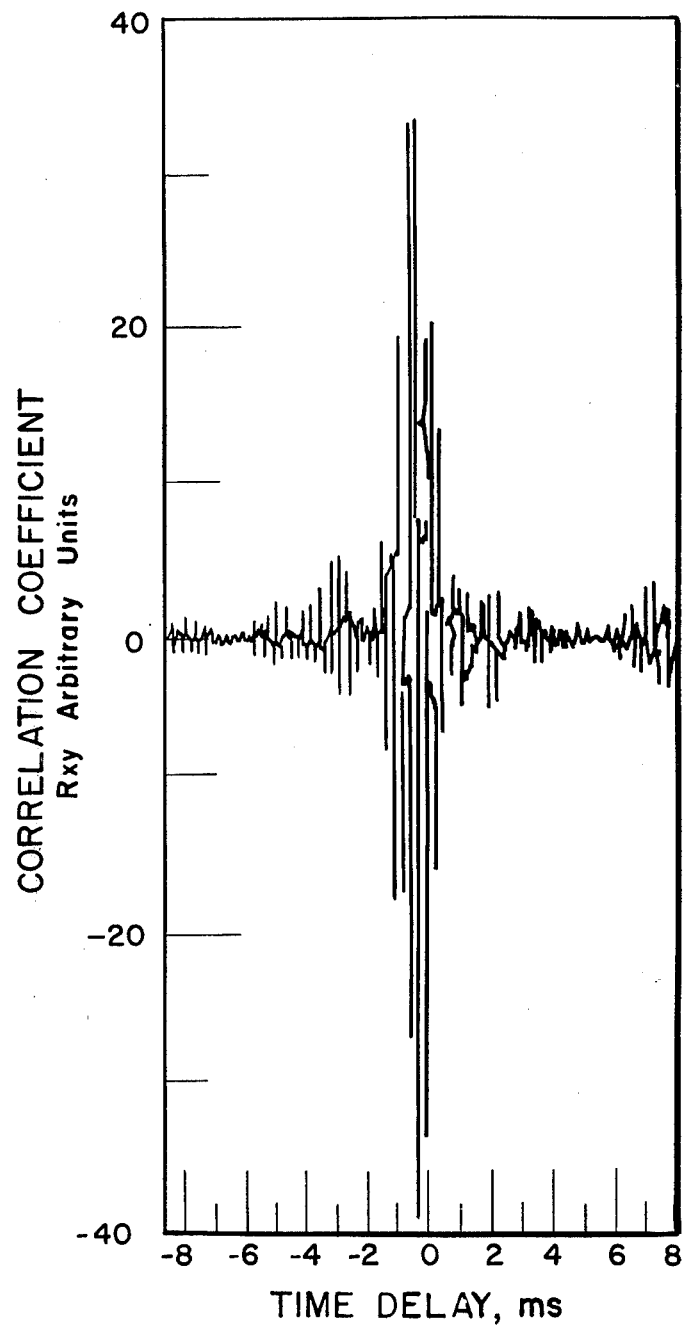
FIG. 6 is an expanded view of a portion of the plot of FIG. 5.

FIGS. 5 and 6 illustrate a cross-correlation coefficient obtained on a test pipe with a known leak. The pipe was carbon steel, type A3, Schedule 40, 207 feet in length and 8 inches in internal diameter. It contained a length of high-voltage transmission cable and was filled with insulating oil maintained at a pressure of the order of 125 psi. A hole having a diameter of 0.035 inches was drilled in the pipe and was allowed to leak into sand to produce the acoustical waves that were detected to produce the correlation plots of FIGS. 5 and 6. The hole was located approximately midway between two sensors of longitudinal waves. The correlogram of FIG. 5 is included for completeness to show the repeated locations of correlations that result from the interaction of reflected waves. The envelope of the set of high peaks near the center of FIG. 5 represents the correlation between signals received directly from the leak to each of the two sensors. The envelope of the next peaks going outward in either direction from the center represent correlations from signals that are reflected from the end caps used to terminate the test section of pipe. These signals are an artifact of the test setup and have been removed in FIG. 6 which is a plot of the center region of FIG. 5, expanded in scale to illustrate better the correlation of the direct signals received by each of the two sensors. It can be seen from FIG. 6 that the peak of the envelope of the correlation is displaced by 0.48 milliseconds from the center of the correlation plot. This displacement in time difference when multiplied by the known velocity of propagation of longitudinal acoustic waves in the fluid indicates that the leak is located a distance of four feet from the center of the pipe in the direction of the transducer that is connected to the cross-correlator as the negative input.

The calculation is performed as follows for the embodiment of FIG. 1:

With a distance l between sensors A and B, denote by X the distance from sensor A to the leak. Sensor B is then a distance $(l-X)$ from the leak. The propagation time of a signal from the leak to sensor A is $\tau_A = X/c$, where c is the acoustic velocity of the wave that is detected, either longitudinal or torsional. The propagation time from the leak to sensor B is $\tau_B = (l-X)/c$. The time difference $$(\tau_A \ \tau_B) = (X/c) - [(l-X)/c] = \frac{2X-l}{c}.$$

Solving, $$X = \frac{(\tau_A - \tau_B)c + l}{2},$$

and the distance of the leak from the midpoint is $$\frac{(\tau_A - \tau_B)c}{2},$$

measured in the direction of the A sensor. Since the first peak of the correlation coefficient occurs at a time difference of $(\tau_A - \tau_B)$, it is necessary only to know the distance $l$ and the acoustic velocity $c$ to locate the leak from the correlogram. The distance $l$ is available to a utility from maps of its system; failing that, it may be measured. Acoustic velocity $c$ will normally be measured by obtaining the correlogram of a signal applied at one sensor with that detected at another. The time delay of the peak, when divided into the distance between sensors, is the acoustic velocity $c$.

A comparable calculation is performed for the embodiment of FIG. 4, where sensors A and B are together and the acoustic velocities differ. In this case, it is necessary to know the respective acoustic velocities, here denoted $c_A$ and $c_B$. Calling x the distance from the sensors to the leak, it follows that $$x = c_A \tau_A = c_B \tau_B,$$

where $\tau_A$ and $\tau_B$ are the respective propagation times of the A and B waves. Hence $\tau_A = x/C_A$ and $\tau_B = x/C_B$, and their difference $(\tau_A - \tau_B) = x(1/C_A - 1/C_B)$. The difference $(\tau_A - \tau_B)$ is determinable from the correlogram, so that $$x = \frac{(\tau_A - \tau_B)(C_A C_B)}{(C_B - C_A)}$$

The cross-correlation between two time-varying voltages $V_1(t)$ and $V_2(t)$ is a measure of the similarity of their statistics. In particular, if the two voltages represent random processes whose statistics do not change in time, then each is said to be stationary. For stationary processes the correlation is well known to be a function only of the time delay in measurement for the case of autocorrelation and to be a function of the time delay in measuring the cross-correlation between two signals. The cross-correlation which is determined as a measure of the location of the leak in the present invention is obtained by applying an appropriately band-limited signal from each of the detectors to a multiplier after applying a variable delay to one of the signals. The product of one of the signals with the delayed second signal is integrated with respect to time to produce a correlation signal that is a function of time delay. In the practice of the present invention, it has been convenient either to make cross-correlations of signals of the same kind (both longitudinal or both torsional) at two different locations or to make cross-correlations of different kinds of signals (one longitudinal and one torsional) at essentially the same location. Note that if different signals are detected at a single location it will be necessary to find out in which direction the leak is, either by measuring at another manhole or by separating the detectors by several feet at the single location.

Either of these methods produces a correlated output that is substantially stationary over the typical period required to make measurements, which is of the order of 15 minutes. The time may vary depending on the ratio of signal to noise and the degree of certainty required by the operator. In general, as the measuring time becomes longer, the peaks in the correlogram become more distinct. The correlations of FIGS. 5 and 6 were recorded with a 15-minute averaging time. Other leaks producing larger acoustical signals can be expected to provide adequate correlation to permit their location in less than 15 minutes. The power of the correlation technique lies in the fact that a leak-signal may be buried in noise, yet the location of the leak may be obtained with excellent results. In FIGS. 5 and 6 the leak-signal output from the amplifiers was mixed with a random noise signal so that the leak-signal power and the noise-signal power were equal and therefore only marginally detectable with a passive acoustic device which measures signal power. The correlogram shown in FIG. 5 has a 48-dB signal-to-noise ratio. Thus a large gain in the signal-to-noise ratio is achieved through the correlation technique. This allows one to locate leaks that were previously undetectable.

The embodiments of the invention in which an exclusive property or privilege is claimed are defined as follows:

1. A method of detecting the location of a leak in a buried pipe that contains a fluid, the method comprising the steps of:
   detecting acoustic waves of a first particular type produced by the leak and propagated to a first location;
   detecting acoustic waves of a second particular type produced by the leak and propagated to a second location;
   transmitting the detected acoustic waves from the second location to the first location; and
   determining a cross-correlation between the detected acoustic waves from the first location and the detected acoustic waves from the second location;
   which cross-correlation is a measure of the location of the leak with respect to the first and second locations.

2. The method of claim 1 wherein the first and second particular types of acoustic waves are longitudinal acoustic waves.

3. The method of claim 1 wherein the first and second particular types of acoustic waves are torsional acoustic waves.

4. A method of detecting the location of a leak in a buried pipe that contains a fluid, the method comprising the steps of:
   detecting longitudinal acoustic waves at a measuring location;
   detecting torsional acoustic waves at the measuring location; and
   determining a cross-correlation between the detected longitudinal acoustic waves and the detected torsional acoustic waves,
   which cross-correlation provides a measure of the location of the leak with respect to the measuring location.

5. An apparatus for detecting a location of a leak in a buried pipe containing a fluid through the use of acoustical signals produced in the fluid by the escape of fluid at the leak, the apparatus comprising:
   a first detector of acoustic waves disposed in acoustical contact with the pipe at a first location;

a second detector of acoustic waves disposed in acoustical contact with the pipe at a second location;

means connected to the second detector for communicating a signal detected by the second detector to the first location; and means responsive to a signal from the first detector and to the communicated signal from the second detector for measuring cross-correlation between the signals, which cross-correlation is interpretable to indicate the distance of the leak from the first and second locations.

6. The apparatus of claim 5 wherein the first and second detectors are detectors of longitudinal acoustic waves.

7. The apparatus of claim 5 wherein the first and second detectors are detectors of torsional acoustic waves.

8. The apparatus of claim 5 wherein the means for measuring cross-correlation comprise an electronic cross-correlator having a visual display.

9. An apparatus for detecting a location of a leak in a buried pipe through the use of acoustical signals produced in the fluid by the escape of fluid at the leak, the apparatus comprising:

a detector of longitudinal acoustic waves disposed at a measuring location;

a detector of torsional acoustic waves disposed at the measuring location; and means connected to the detectors of longitudinal and torsional acoustic signals for obtaining a correlogram of signals detected by the detectors, which correlogram provides a measure of distance from the measuring location to the leak.

* * * * *